Figure 1:
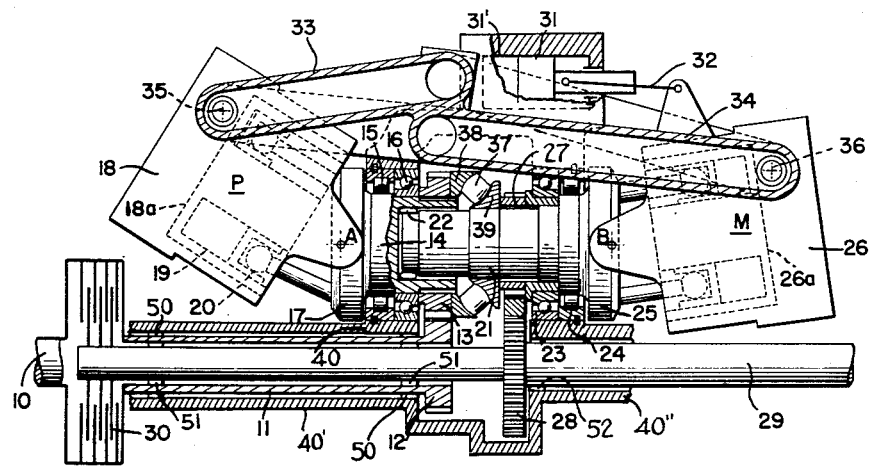

Oct. 18, 1960   F. G. GRABOW   2,956,407
HYDROSTATIC TRANSMISSION
Filed Oct. 9, 1956   3 Sheets-Sheet 1

INVENTOR
FRITZ G. GRABOW

BY  Dicke and Craig.

ATTORNEYS

Oct. 18, 1960 F. G. GRABOW 2,956,407
HYDROSTATIC TRANSMISSION
Filed Oct. 9, 1956 3 Sheets-Sheet 2
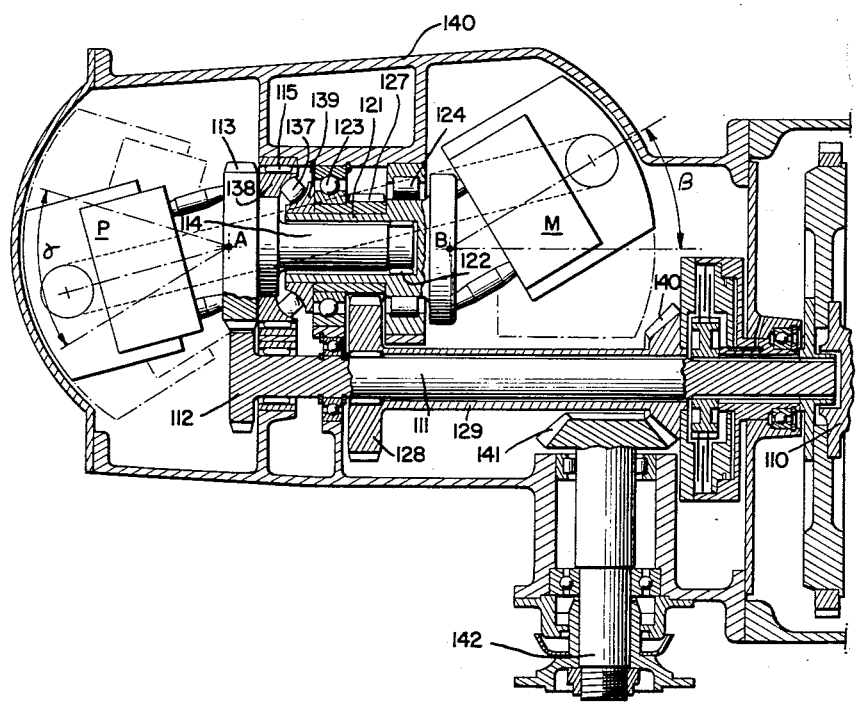
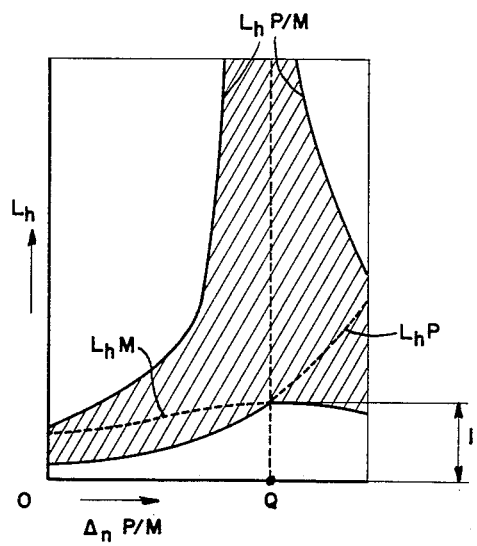
INVENTOR
FRITZ G. GRABOW
BY
ATTORNEYS Oct. 18, 1960    F. G. GRABOW    2,956,407
HYDROSTATIC TRANSMISSION
Filed Oct. 9, 1956    3 Sheets-Sheet 3

INVENTOR
FRITZ G. GRABOW

BY Dicke and Craig
ATTORNEYS

United States Patent Office
2,956,407
Patented Oct. 18, 1960

2,956,407

HYDROSTATIC TRANSMISSION

Fritz G. Grabow, Stuttgart-Unterturkheim, Germany, assignor to Daimler-Benz Aktiengesellschaft, Stuttgart-Unterturkheim, Germany Filed Oct. 9, 1956, Ser. No. 662,957

12 Claims. (Cl. 60—53)

The present invention relates to a hydrostatic transmission, and more particularly to a hydrostatic transmission having a transmission pump and transmission motor which are braced or supported against each other in the axial direction.

In the past, considerable difficulties arose in hydrostatic transmissions in connection with the absorption of the high axial pressures with which the rotating parts subjected to the pressure of the pressure fluid support themselves at the stationary parts of the transmission. As a result of the simultaneous occurrence of the high rotational speeds and the high pressures in the hydrostatic transmissions, the bearings which are used to absorb the axial pressures, for example, also roller bearings, have only a relatively limited working life.

The present invention aims above all at an elimination of these difficulties and consists essentially in that the transmission pump and the transmission motor of the hydraulic transmission are axially braced or supported against each other. The pressures which occur in the pump and in the motor may, therefore, compensate or balance each other at least in part, whereby, with the interposition of a supporting axial-thrust bearing, considerably smaller relative speeds take place at such a bearing than is the case in bearings which support the rotating parts of the pump or the motor at the stationary housing. In that case, a tapered roller bearing is appropriately used as axial supporting bearing between the transmission pump and motor.

The control of the transmission ratio between the pump and motor takes place preferably by slewing or swinging the pump or motor aggregate, whereby the pump and motor may also be swung or slewed together as a unit.

In pump and motor aggregates or units which are arranged parallel to the driving and driven shafts and to one side thereof, an arrangement, in which the input or driving shaft and output or driven shaft are located in the axial direction thereof on the same side of the transmission is particularly advantageous. The swinging or slowing movements of the pump or motor aggregate in that case are not impeded by a continuous or uninterrupted driving or driven shaft so that a particularly wide control range may be obtained for the hydrostatic transmission.

Accordingly, it is an object of the present invention to provide a construction of a hydrostatic transmission in which the relatively high axial pressures are absorbed in a particularly favorable manner.

Another object of the present invention resides in the construction of a hydrostatic transmission in which the bearings supporting the rotating parts are relieved of the very high pressures which ordinarily occur therein whereby the working life of the bearings is increased considerably.

Still another object of the present invention is to provide such a construction of a hydrostatic transmission in which the pressures which occur in the pump and motor are so brought to bear against each other that they compensate or cancel each other at least in part.

Another object of the present invention is to provide a thrust bearing intermediate the transmission pump and motor which is subjected to the axial forces occurring between the mutually braced pump and motor aggregates or units in such a manner as to reduce the relative rotational speeds at the bearing.

Still another object of the present invention is to provide a construction of a hydrostatic transmission in which a particularly wide control range may be obtained by the arrangement of continuous driving and driven shafts on the same side of the transmission as seen in the axial directions thereof.

Figure 2:
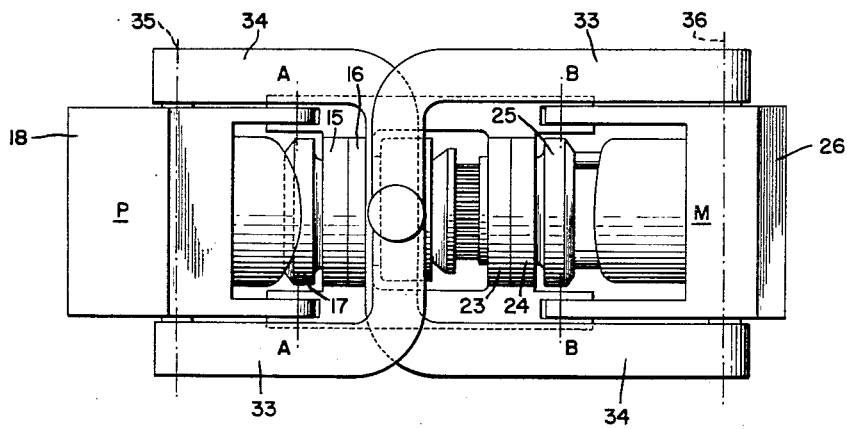

Other features, objects, and advantages of the present invention will become more obvious from the following description when taken in connection with the accompanying drawing which shows, for purposes of illustration only, two embodiments in accordance with the present invention, and wherein:

Figure 1 is a side view, partially in cross section, through a first embodiment of a hydrostatic transmission in accordance with the present invention, Figure 2 is a plan view of the hydrostatic transmission of Figure 1 in accordance with the present invention.

Figure 5:
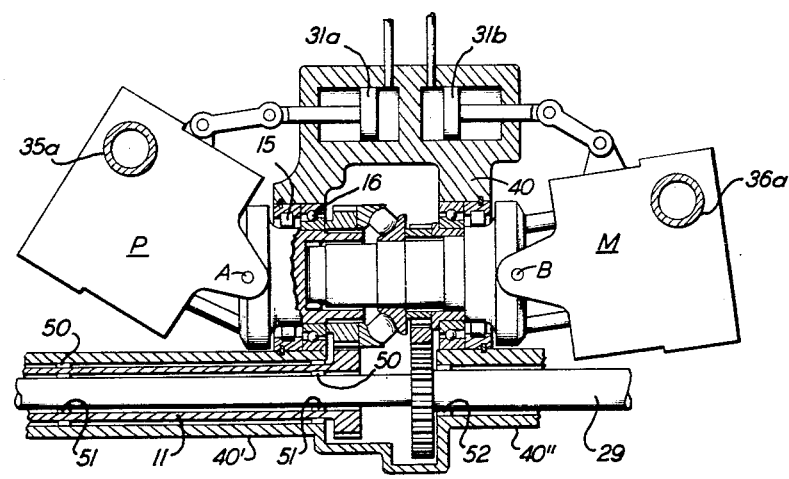

Figure 3 is an axial, cross-sectional view of another embodiment of a hydrostatic transmission in accordance with the present invention, Figure 4 is a diagram illustrating the increased working life of the bearing arrangement in accordance with the present invention which is disposed between the transmission pump and transmission motor, and Figure 5 is a side view partially in cross section of another embodiment of a hydrostatic transmission in accordance with the present invention.

Referring now more particularly to the drawing wherein like reference numerals are used throughout the various views to designate like parts, and more particularly to Figures 1 and 2 thereof, reference numeral 10 designates a drive shaft, for example, the engine shaft of a vehicle driving engine by means of which the hydrostatic transmission is driven. The drive from the engine shaft 10 takes place over a hollow shaft 11 securely connected with the drive shaft 10. These shafts are supported by an extension 40' of a stationary housing 40, bearings 50 being disposed between this extension and shaft 11. A gear wheel 12 which is securely mounted on the hollow shaft 11 or formed integral therewith is in meshing engagement with a gear wheel 13 which itself is mounted on the hollow pump shaft 14 for common rotation therewith, for example, by means of a splined arrangement.

The hollow pump shaft 14 is supported in the stationary housing 40 by means of roller bearing 15 and ball bearing 16 and is rigidly connected in any suitable manner with the driving disk 17 which effectively constitutes a swash plate for the transmission pump P.

The non-rotating drum or cylinder 18 housing the rotating drum or cylinder part 18a of the pump P is connected in a slewable or swingable manner with the stationary housing or casing 40 about an axis of rotation A in such a manner that the pump pistons 20 which are reciprocable in the cylinders 19 of the cylinder part 18a carry out the greater piston stroke the more the cylinder 18 is adjustably inclined about the axis A with respect to the driving disk or swash plate 17.

The motor shaft 21 is supported in the hollow pump shaft 14, for example, by means of needle bearings 22. Furthermore, the motor shaft 21 is supported in the stationary housing 40 by means of a ball bearing 23 and a roller bearing 24. The driving disk 25 which effectively constitutes the swash plate for the motor M is drivingly connected with the motor shaft 21 in any suitable manner. The drum or cylinder part 26a of the drum or cylinder 26 is taken along in the direction of rotation by the driving disk 25 by means of connecting rods and rolls in a similar manner as in connection with the pump P.

The drum or cylinder 26 of the driving motor M is supported at the housing 40 in a slewable or pivotal manner about the joint axis B in a manner similar to the pump P about the joint axis A.

The motor shaft 21 is drivingly connected with the driven or output shaft 29 by means of a pair of gear wheels 27 and 28. The driven or output shaft 29 extends forwardly through the hollow shaft 11 and may be coupled with the hollow shaft 11 and therewith also with the engine shaft 10 by means of a clutch 30 so as to obtain a direct speed by-passing the hydrostatic transmission. Bearings 51 are disposed between shaft 11 and shaft 29, the latter shaft being further supported by an extension 40" of stationary casing 40 and bearings 52 therein.

The transmission pump P and transmission motor M are preferably hydraulically controlled in their swinging or slewing movements, for example, by means of a piston 31 which is connected with the drum or cylinder 26 of the motor M through a connecting rod 32. Pressure fluid is supplied to the cylinder 31' for the piston 31 in the usual manner.

A pipe aggregate formed as a unitary construction which consists, as particularly indicated in Figure 2, of two essentially S-shaped tubes or pipes 33 and 34 crossing each other and which are also connected with each other, for example, rigidly, serves as hydrostatic connection of the pump P and the motor M. The pipe system 33 and 34 serves simultaneously as guide connection between the joint axis 35 at the pump P and the joint axis 36 at the motor M.

As indicated in the drawing, the pump P and the motor M are arranged essentially axially opposite each other with respect to a center transverse plane perpendicular to the axis of the drive or driven shafts 11 and 29, respectively. Consequently, the pressures which occur in the cylinder space 19 due to the reciprocation of the pump pistons 20 of the pump P and the pressures occurring in the corresponding cylinder spaces of the motor M which act on the pistons of the motor M are thereby disposed essentially axially opposite each other, in that the pump shaft 14 supports itself against the motor shaft 21 by means of an interposed tapered roller bearing 37 or the like. The outer race 38 of the thrust bearing 37 thereby supports or braces itself in turn against the gear wheel 13 on the pump shaft 14 while the inner race 39 thereof supports or braces itself against the gear wheel 27 at the motor shaft 21.

Figure 3 illustrates an embodiment which is similar to that of Figures 1 and 2. Corresponding parts are designated therein with corresponding reference numerals of the one hundred series.

The driving or input shaft, which drives the hydrostatic transmission of this embodiment, is formed in this case as the inner shaft 111 located within the hollow driven or output shaft 129 which, in turn, drives a cross shaft 142 over bevel gear wheels 140 and 141. As seen from the hydrostatic transmission, the driving shaft 111 and driven shaft 129 as well as the cross shaft 142 and the bevel gears 140 and 141 are disposed on the same side of the transmission. As a result of such a construction, the pump P may be slewed or swung in both directions, for example, all together through an angle α about the pivot axis A and thereby provides a relatively wide control range of the transmission.

The inner pump shaft 114 which in this case is supported within the motor shaft 121 by means of needle bearings 122, is again supported against the motor shaft 121 by means of a tapered roller bearing 137 or the like, the outer race 138 of which braces itself or abuts against the gear wheel 113 of the pair of meshing gear wheels 112 and 113, while the inner race 139 thereof braces itself or abuts against a hub-like extension of the gear wheel 127 splined to the motor shaft 121, the gear wheel 127 being in meshing engagement with the gear wheel 128.

Furthermore, the pump shaft 114 is supported in the stationary housing or casing 140 of the transmission by a needle bearing 115 while the motor shaft 121 is supported in the casing or transmission housing 140 by means of a ball bearing 123 and a roller bearing 124. As to the rest, the operation of the construction of Figure 3 is in principle the same as that of the embodiment illustrated in Figures 1 and 2.

It is understood, however, that the pump and motor are not necessarily connected by a non-adjustable or rigid rod or pipe system. If so desired, the pump P and the motor M may also be individually slewable about the axes A and B, respectively, as shown in Figure 5, which illustrates such individal controls. Of course, such individual controls would also be applicable to the structure of Figure 3 in which the pump P may be swingable or slewable about a larger angle α than the motor M which is slewable about a smaller angle β. The angle β is smaller because the transmission motor M is limited in its slewing or swinging movements by the driving shaft 111 or driven shaft 129. As shown in Figure 5, the swinging movements of pump P and motor M are individually controlled by fluid pressure means comprising pistons 31a and 31b received in cylinders integral with casing 4 and respectively link-connected with the pump P and motor M, respectively.

Figure 4 illustrates diagrammatically the working life which may be expected from a pump and motor which are directly supported against one another by means of a supporting bearing 37 or 137 as compared to the working life of a bearing used heretofore to support the pump or motor against the stationary housing in the axial direction thereof.

The ratio of rotational speed of the pump to the motor $\Delta_n P/M$ is plotted along the abscissa of the diagram while the working life $L_h$ in hours is indicated along the ordinates. The curve $L_h P$ indicates the working life of a pump bearing in which the pump is supported against the stationary housing and the curve $L_h M$ the working life of a motor bearing which supports the motor against the stationary housing, while the curve $L_h P/M$ indicates the working life of a bearing in accordance with the present invention in which the pump is directly supported against the motor.

At the point Q at which the transmission pump and transmission motor operate at the same rotational speed, each of the bearings constructed in accordance with the prior art which support the pump or motor against the stationary housing possesses a working life "l." At the same time, however, the working life of a bearing in accordance with the present invention increases theoretically to infinity as no difference in rotational speed exists between the inner and outer races of the bearing at that moment. However, since the differences in rotational speed in a bearing according to the present invention are also generally considerably smaller than with the usual bearings which provide a bearing support against the stationary housing the working life of a bearing in accordance with the present invention in practice always lies considerably above the working life of a bearing which is supported in the known manner against the stationary housing.

While I have shown and described only two preferred embodiments in accordance with the present invention, it is understood that the same is not limited thereto but is susceptible of many changes and modifications in accordance with the present invention, and I intend to

I claim:
1. A hydrostatic transmission comprising a transmission pump having an input means and a transmission motor having an output means, means for hydraulically connecting said pump and motor, a pump shaft for said transmission pump extending toward said transmission motor and connected with said input means and a motor shaft for said transmission motor connected with said output means, said motor shaft extending toward said transmission pump, said pump and said motor each comprising a unit adapted to receive the hydraulic pressure medium, each said unit comprising a non-rotatable casing and a rotatable drum therein and further comprising pivotable mounting means therefor confining each said unit to a swinging movement, each said unit further comprising reciprocatory means in said rotatable drum for coaction with said hydraulic pressure medium, said pump further comprising means for operatively connecting said reciprocatory means of said pump unit to said pump shaft, said last-named reciprocatory means imposing a pressure on said pump shaft in the direction of said transmission motor, said motor further comprising means for operatively connecting the said reciprocatory means of said motor unit to said motor shaft, said reciprocatory means of said motor unit imposing a pressure on said motor shaft in the direction of said transmission pump, means interconnecting said pump shaft and said motor shaft for absorbing the said pressure on said pump shaft and the said pressure on said motor shaft, said interconnecting means comprising bearing means.

2. A hydrostatic transmission according to claim 1, wherein said pump shaft and said motor shaft are coaxial.

3. A hydrostatic transmission according to claim 1, wherein means are provided for varying the capacity of said pump and said motor, said last-named means comprising means for causing pivotal movement of each said unit.

4. A hydrostatic transmission comprising a transmission pump and a transmission motor, a pump shaft for said transmission pump and a motor shaft for said transmission motor having a common shaft axis, means for hydraulically connecting said pump and said motor, said pump and said motor each including a pivotable unit adapted to receive the hydraulic pressure medium, each said unit comprising a non-rotatable casing and a rotatable drum therein, means for pivoting at least one said unit about an axis transverse to said common shaft axis, each said unit comprising reciprocatory means disposed within said drum, said pump further comprising means for operatively connecting said reciprocatory means of said pump unit to said pump shaft, said motor further comprising means for operatively connecting the said reciprocatory means of said motor unit to said motor shaft, said hydraulic pressure medium being in coaction with those parts of said reciprocatory means of said pump unit and said motor unit most remote from said pump shaft and said motor shaft, said coaction imposing a pressure on said pump shaft in one axial direction and a pressure on said motor shaft in the opposite axial direction, interconnecting means between said pump shaft and said motor shaft for absorbing each said pressure, said interconnecting means comprising bearing means, an input shaft and an output shaft, gear means including gears on said pump shaft and said motor shaft for drivingly connecting said input shaft and said pump shaft and for drivingly connecting said motor shaft and said output shaft, said bearing means being disposed between said gears, said input and output shafts being offset from said common axis in a non-interfering position relative to the pivoting movement of said one pivotable unit.

5. A hydrostatic transmission comprising a transmission pump having an input shaft and transmission motor spaced therefrom having an output means, means for hydraulically connecting said pump and said motor, said transmission pump having a rotating pump part connected to said input shaft and having a pivotable further part receiving the hydraulic pressure medium, said further part comprising a non-rotatable casing and a rotatable drum therein, reciprocating means in said drum operatively connected with said rotating pump part, said hydraulic pressure medium being in coaction with said reciprocating means, said coaction being effective to cause a thrust from said reciprocating means to said rotating pump part along its axis of rotation in the direction of said transmission motor, said transmission motor having a motor part rotating about said axis and connected to said output means and having a pivotable further part receiving the hydraulic pressure medium, said last-named further part comprising a non-rotatable casing and a rotatable drum therein, reciprocating means in said last-named drum operatively connected with said rotating motor part, said hydraulic pressure medium being in coaction with said last-named reciprocating means, said last-named coaction being effective to cause a thrust from said last-named reciprocating means to said rotatable motor part along said axis in the direction of said pump, said rotating pump part and said rotating motor part being interconnected by means absorbing the said thrust of said rotating pump part and the said thrust of said rotating motor part.

6. A hydrostatic transmission according to claim 5, further comprising means for pivoting said first-named pivotable part and said second-named pivotable part in unison.

7. A hydrostatic transmission comprising a pump unit having an input means and a motor unit having an output means, each said unit comprising a rotatable part and a pivotable part comprising a non-rotatable casing and a rotatable drum therein, the rotatable part of said pump unit being connected to said input means and having an axis in common with the rotatable part of said motor unit, the rotatable part of said motor unit being connected to said output means, a stationary support, each said pivotable part being pivotally mounted on said stationary support, each said pivotable part being adapted to receive a hydraulic pressure medium, each said drum being provided with movable means in coaction with said hydraulic medium and subject to thrust in response to said coaction, said movable means of the drum of said pump unit having an operative connection with said rotatable part of said pump unit, said operative connection of said pump unit transmitting thrust from said last-named movable means to said rotatable part of said pump unit along said axis in the direction of the said rotatable part of said motor unit, said operative connection of said motor unit transmitting a thrust from said movable means of the drum of said motor unit to said rotatable part of said motor unit along said axis in the direction of the said rotatable part of said pump unit, means interconnecting said rotatable part of said pump unit and said rotatable part of said motor unit for absorbing said first-named thrust and said second-named thrust, said first-named operative connection being located between said interconnecting means and said pivotal part of said pump unit, and said second-named operative connection being located between said interconnecting means and said pivotal part of said motor unit, and conduit means for said hydraulic pressure medium joining said pivotable part of said pump unit with said pivotable part of said motor unit, said conduit means having a joint connection with each of said two last-named parts, said interconnecting means including bearing means.

8. A hydrostatic transmission according to claim 5, wherein said means for hydraulically connecting said pump and said motor includes guide means interconnecting said first-named pivotable part and said second-named pivotable part.

9. A hydrostatic transmission according to claim 8, wherein said guide means includes two S-shaped pipes crossing each other and rigidly connected with each other.

10. A hydrostatic transmission according to claim 6, wherein said input means and output means comprise parallel shafts disposed on the same side of said hydrostatic transmission with respect to said axis of rotation.

11. A hydrostatic transmission according to claim 7, wherein said bearing means comprises a tapered roller bearing.

12. A hydrostatic transmission according to claim 7, wherein means including said conduit means are provided for pivoting said pivotable part of said pump unit and for pivoting said pivotable part of said motor unit in unison to vary the transmission ratio of said pump and motor.

References Cited in the file of this patent

UNITED STATES PATENTS

| | | |
|---|---|---|
| 1,539,616 | Williams | May 26, 1925 |
| 1,840,864 | Rayburn et al. | Jan. 12, 1932 |
| 2,371,974 | Neuland | Mar. 20, 1945 |
| 2,452,704 | Wahlmark | Nov. 2, 1948 |
| 2,777,286 | Badalini | Jan. 15, 1957 |

FOREIGN PATENTS

| | | |
|---|---|---|
| 15,946 | France | Aug. 8, 1912 |
| 168,222 | Switzerland | June 16, 1934 |